UNITED STATES PATENT OFFICE.

WILLIAM HENRY PERKIN, CHARLES WEIZMANN, AND HAROLD DAVIES, OF MANCHESTER, ENGLAND.

MANUFACTURE OF HALOGEN DERIVATIVES OF ORGANIC COMPOUNDS.

1,144,237. Specification of Letters Patent. Patented June 22, 1915.

No Drawing. Application filed December 30, 1912. Serial No. 739,409.

*To all whom it may concern:*

Be it known that we, WILLIAM HENRY PERKIN and CHARLES WEIZMANN, both subjects of the King of Great Britain and Ireland, and residents of The University, Manchester, in the county of Lancaster, England, and HAROLD DAVIES, a subject of the King of Great Britain and Ireland, of 5 West Grove, Manchester, aforesaid, have invented new and useful Improvements in the Manufacture of Halogen Derivatives of Organic Compounds, of which the following is a specification.

We have found that if we halogenate vapors of organic compounds and regulate the access of halogen in such manner as to use it up immediately it comes into contact with the vapors of the organic compound and in such manner as to permit of the removal of the desired product, the formation of higher halides than that desired can be lessened, or almost entirely prevented, according to the efficiency of the means of removal, and the amount formed is very much less than that formed if the same quantity of halogen be passed into the liquid. Moreover, the product of the reaction can, when required, by fractional distillation, be separated into definite fractions each containing a definite halogen substitution product which can be identified and obtained in a high state of purity.

According to our present invention therefore we take the body to be halogenated and vaporize it and subject the vapor to the vapor of the halogen in such manner that vapor of the halogen is immediately consumed and the required product, as it is formed, is removed from the zone of reaction, there being always an excess of the vapor of the body to be halogenated and a minimum of the required product present in the reaction area.

The process may be carried out by passing a stream of vapor of the halogen into a tube, or vessel, through which a stream of the vapor of the body being treated passes, larger in quantity than the theoretical amount required to combine with the halogen, the product formed condensing and passing at once from the zone of reaction and the product can then be fractionated and the insufficiently halogenated fractions be again subjected to the reaction.

The apparatus for carrying out this invention may be such as is described in either the application for British Letters Patent No. 13,051/12, or No. 22,737/12, one form of such an apparatus being described and illustrated in the paper by Prof. Perkin in the *Journal of the Society of Chemical Industry,* July 15th, 1912, but we do not limit ourselves to the use of such apparatus.

The reaction can, if desired, be accelerated by heat, or light, or by other agents which assist halogenation, such for example as phosphorus compounds, or iodin.

It has been proposed to mix halogen with vapors of organic bodies and then treat the mixture so as to cause combination to take place, but we have found that the presence of such a mixture is disadvantageous and causes a risk of explosion. In the process now described the combination of the halogen with the hydrogen should be so nearly instantaneous that the vapors in the reaction chamber are not perceptibly tinged with halogen. To attain this end it is sometimes necessary to accelerate the reaction by the aid of light or other known means particularly when treating low boiling liquids and at the commencement of the process. In many cases however such acceleration is unnecessary and the halogenation proceeds satisfactorily at the temperature obtaining in the reaction chamber, even in the absence of light. In most cases after the reaction has once been started the use of light is unnecessary.

We give the following examples of how this invention may be performed, but we do not limit ourselves to these particular examples.

*Example 1 — Chlorination of iso-amyl chlorid to form a dichloro compound.*—600 grams of iso-amyl chlorid

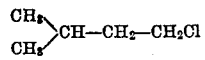

are vaporized and chlorinated in the aforesaid apparatus until the mixture of iso-amyl chlorid and the higher chlorids produced boils at about 130° centigrade (as shown by a thermometer immersed in the liquid). The product is then, by fractional distillation, separated into the following portions, namely: (1) A portion boiling below about 140° centigrade and containing considerable unaltered iso-amyl chlorid and this portion may be further treated with chlorin as described, or, if desired, the unaltered iso-amyl chlorid can be separated and treated with chlorin as described. (2.) A portion boiling at about 140° to 170° centigrade. (3.) A portion boiling up to 105° in vacuo. (4.) A residue which contains trichlorids, or higher chlorids.

The portions (2) and (3) contain principally dichlorids and may be fractionated in any known, or suitable, manner, yielding three main fractions, namely:

(A.) A fraction of a boiling point about 142° centigrade corresponding to the formula

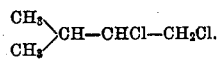

(B.) A fraction of a boiling point about 150° centigrade corresponding to the formula

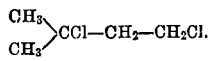

(C.) A fraction of a boiling point about 170°–172° centigrade corresponding to the formula

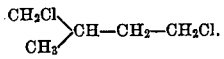

The constitution of the fraction A was proved by eliminating from it two molecular proportions of hydrochloric acid and so transforming it into iso-propyl-acetylene which, on treatment with aqueous mercuric bromid, and on decomposition of the double compound formed, yielded methyl-iso-propyl-ketone which was characterized by its semi-carbazone.

The constitution of the fraction B was proved by eliminating two molecular proportions of hydrochloric acid thus producing isoprene, which was identified by transforming it into the dibrom-hydrin melting at 86° centigrade. The isoprene so obtained, when submitted to polymerization, resulted in a caoutchouc-like mass. The dichlorid was found to be identical with the isoprene dihydrochlorid obtained by Ipatiew by the addition of two molecular proportions of hydrochloric acid to unsymmetrical dimethyl-allene.

The constitution of the fraction C was proved by transforming it into a di-nitrile by boiling it with alcoholic potassium cyanid. This di-nitrile, which boils at about 155° centigrade (11 mm.) gave, on hydrolysis, a dibasic acid identical with beta-methyl-adipic acid. On heating the fraction C with anhydrous potassium acetate in glacial acetic acid and distilling the product, a diacetate was obtained which boiled at about 116°–117° centigrade (17 mm.). This diacetate, on hydrolysis, yielded a glycol boiling at 124°–125° centigrade (13 mm.) which, on treatment with phenyl iso-cyanate, gave a diphenyl diurethane of a melting point of 97° centigrade. The diacetate, the glycol, and the urethane, are identical with those obtained by Harries (*Annalen*, 383, pp. 167-172).

The constitution of the dibromid of Harries was proved by him to be

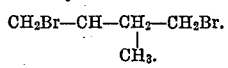

*Example 2—Preparation of 1.2.3.4-tetra-chlor-butane.*—Seventy-eight parts by weight of butyl-chlorid are subjected to the action of chlorin in the presence of ultraviolet rays, until the mass has increased by sixty parts by weight. The product is then subjected to fractional distillation under reduced pressure; after separation of unaltered butyl-chlorid, the result of this fractional distillation under a pressure of fifteen millimeters was found to be as follows: Of fraction I, which distilled off between 55° and 74° centigrade, there were thirteen parts; of fraction II, which distilled off between 74° and 90° centigrade, there were forty-nine parts; of fraction III, which distilled off between 90° and 95° centigrade, there were sixteen parts, and of fraction IV, which distilled off between 95° and 105° centigrade, there were eight parts. The residue consisted of seven parts.

Fraction II consisted of a mixture of tri-chloro and tetra-chloro bodies.

Fraction III consisted of a pure tetra-chloro body which yielded divinyl on treatment with zinc dust and alcohol and the divinyl thus obtained was identified by means of its tetra-bromid.

*Example 3—Production of monochlor heptane.*—300 grams of normal heptane of boiling point 96°–100° centigrade are chlorinated in the aforesaid apparatus until the weight increases to 350 grams, the temperature in the vessel of reaction being 90° centigrade. By this means we obtained 224 grams of unchanged heptane, 116 grams of monochlor-heptane and 10 grams of dichlor-heptane, the formation of the dichlorids being thus only 3 per cent. of the amount of normal heptane used. The temperature of the mixed vapors and gases in the zone of reaction is below the boiling point of the heptane owing to the presence of the other substances entering into the reaction. Their combined vapor pressures are equal to atmospheric pressure since there is a reflux condenser above the reaction chamber.

*Example 4—Preparation of dibrom-iso-pentane.*—Iso-amyl-bromid of boiling point 120° centigrade is vaporized and heated with a stream of bromid vapor and air in the presence of light until a thermometer immersed in the liquid being vaporized shows a temperature of 150° centigrade. The liquid obtained as the result of the reaction is then fractionated under reduced pressure and yields unchanged monobromid together with dibromids, principally 1.3-dibrom-isopentane of boiling point 72° to 75° at a pressure of 15 mm.

*Example 5—Preparation of mono-chlor acetic acid.*—An excess of vapor of acetic acid is passed through a glass, or silica, tube, into which also a stream of chlorin is passed, a powerful source of chemically active light being situated near the said tube. The vapors are condensed and fractionated and unaltered acetic acid again treated.

What we claim is:—

1. The manufacture of dichloro derivatives of paraffin hydrocarbons having the chlorin attached to different carbon atoms by causing a halogen to react with vapors of a mono-chlorinated paraffin hydrocarbon while regulating the access of the halogen so that it is used up immediately it comes into contact with said vapors, substantially as described.

2. The manufacture of dichloro derivatives of paraffin hydrocarbons having the chlorin attached to different carbon atoms by causing a halogen to react with vapors of a mono-chlorinated paraffin hydrocarbon while regulating the access of the halogen so that it is used up immediately it comes into contact with said vapors removing the desired halogenated product as it is formed and subjecting it to fractional distillation.

3. The manufacture of dihalogen-derivatives of hydrocarbons having the halogen atoms attached to different carbon atoms, by causing a halogen to react with vapors of a mono-halogen-hydrocarbon while regulating the access of the halogen so that it is used up immediately it comes into contact with the said vapors.

4. The manufacture of dichloro-derivatives of hydrocarbons having the chlorin atom attached to different carbon atoms, by causing chlorin to react with vapors of a monochloro-hydrocarbon while regulating the access of chlorin so that it is used up immediately it comes into contact with the said vapors.

In testimony whereof we have signed our names to this specification in the presence of two subscribing witnesses.

WILLIAM HENRY PERKIN.
CHARLES WEIZMANN.

Witnesses as to William Henry Perkin and Charles Weizmann:
MALCOLM SMEKUERST,
GEORGE WEAVER.

HAROLD DAVIES.

Witnesses as to Harold Davies:
O. J. WORTH,
O. P. LIDDON.